US011558160B2

(12) United States Patent
Choi et al.

(10) Patent No.: US 11,558,160 B2
(45) Date of Patent: Jan. 17, 2023

(54) POSITIONING SYSTEM TO LEVERAGE MAP DATA COLLECTED BY USER EQUIPMENT

(71) Applicant: QUALCOMM Incorporated, San Diego, CA (US)

(72) Inventors: Chang-Sik Choi, Seoul (KR); Kapil Gulati, Belle Mead, NJ (US); Junyi Li, Franklin Park, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 141 days.

(21) Appl. No.: 17/187,556

(22) Filed: Feb. 26, 2021

(65) Prior Publication Data

US 2022/0278791 A1   Sep. 1, 2022

(51) Int. Cl.
*H04W 24/10* (2009.01)
*H04L 5/00* (2006.01)
*G01S 5/02* (2010.01)
*H04W 64/00* (2009.01)

(52) U.S. Cl.
CPC .......... *H04L 5/0048* (2013.01); *G01S 5/0236* (2013.01); *H04W 24/10* (2013.01); *H04W 64/006* (2013.01)

(58) Field of Classification Search
CPC .... H04L 5/0048; G01S 5/0236; H04W 24/10; H04W 64/006
See application file for complete search history.

(56) References Cited

U.S. PATENT DOCUMENTS

| | | |
|---|---|---|
| 2020/0136748 A1 | 4/2020 | Beeri et al. |
| 2022/0070614 A1 | 3/2022 | Lee et al. |
| 2022/0196780 A1* | 6/2022 | Dwivedi ........... H04W 72/0446 |
| 2022/0217527 A1* | 7/2022 | Naujok ................ H04W 12/66 |
| 2022/0229144 A1* | 7/2022 | Bi ........................ H04W 24/10 |

FOREIGN PATENT DOCUMENTS

| | | |
|---|---|---|
| EP | 3902292 A1 | 10/2021 |
| WO | 2020125310 A1 | 6/2020 |
| WO | 2020141857 A1 | 7/2020 |

OTHER PUBLICATIONS

International Search Report and Written Opinion—PCT/US2022/011375—ISA/EPO—dated Apr. 12, 2022.

* cited by examiner

*Primary Examiner* — Chuong A Ngo
(74) *Attorney, Agent, or Firm* — Thien T. Nguyen

(57) ABSTRACT

In an aspect, an initiator transmits a positioning reference signal. The initiator receives a plurality of responder positioning reference signals sent from individual responders of a plurality of responders. The initiator transmits a measurement message comprising a first set of measurements that are determined based on the positioning reference signal and the plurality of responder positioning reference signals. The initiator receives responder measurement messages sent from the individual responders of the plurality of responders. The initiator receives updated map information from an anchor and updates pre-existing map information based on the updated map information.

30 Claims, 9 Drawing Sheets

POSITIONING SYSTEM TO LEVERAGE MAP DATA COLLECTED BY USER EQUIPMENT

BACKGROUND OF THE DISCLOSURE

1. Field of the Disclosure

Aspects of this disclosure relate generally to determining accurate positioning information, and particularly to using map data gathered by individual user equipment (UE) to determine accurate positioning.

2. Description of the Related Art

Currently, vehicles and other user equipment (UE) use sensors (e.g., Global Positioning Satellites (GPS), radar, lidar, and the like) along with network infrastructure equipment (e.g., next generation NodeB (gNB), location management function (LMF), and the like) to determine positions of static objects (e.g., buildings) and dynamic objects (e.g., other vehicles, pedestrians, and the like). However, if the network infrastructure equipment is absent or the signals from the network infrastructure equipment are unable to provide accurate information in dense urban areas, then the UE may be unable to determine accurate positioning information.

SUMMARY

The following presents a simplified summary relating to one or more aspects disclosed herein. As such, the following summary should not be considered an extensive overview relating to all contemplated aspects, nor should the following summary be regarded to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In a first aspect, an initiator transmits a positioning reference signal. The initiator receives a plurality of responder positioning reference signals sent from individual responders of a plurality of responders. The initiator transmits a measurement message comprising a first set of measurements that are determined based on the positioning reference signal and the plurality of responder positioning reference signals. The initiator receives responder measurement messages sent from the individual responders of the plurality of responders. The initiator receives updated map information from an anchor and updates pre-existing map information based on the updated map information.

In a second aspect, a method includes transmitting, by an initiator, a positioning reference signal. The method includes receiving a plurality of responder positioning reference signals sent from individual responders of a plurality of responders. The method includes transmitting a measurement message comprising a first set of measurements that are determined based on the positioning reference signal and the plurality of responder positioning reference signals. The method includes receiving responder measurement messages sent from the individual responders of the plurality of responders. The method includes receiving updated map information from an anchor and updating pre-existing map information based on the updated map information.

In a third aspect, an initiator device includes a wireless transceiver, memory, and one or more processors communicatively coupled to the wireless transceiver and to the memory. The one or more processors are configured to transmit a positioning reference signal, receive a plurality of responder positioning reference signals sent from individual responders of a plurality of responders, transmit a measurement message comprising a first set of measurements that are determined based on the positioning reference signal and the plurality of responder positioning reference signals, and receive responder measurement messages sent from the individual responders of the plurality of responders.

In a fourth aspect, an initiator device includes means for transmitting a positioning reference signal, means for receiving a plurality of responder positioning reference signals sent from individual responders of a plurality of responders, means for transmitting a measurement message comprising a first set of measurements that are determined based on the positioning reference signal and the plurality of responder positioning reference signals, means for receiving responder measurement messages sent from the individual responders of the plurality of responders, means for receiving updated map information from an anchor, and means for updating pre-existing map information based on the updated map information.

In a fifth aspect, a responder device receives an initiator positioning reference signal from an initiator device and receives one or more responder positioning reference signals from one or more additional responder devices. The responder device transmits a positioning reference signal. The responder device transmits a measurement message comprising a first set of measurements that are determined based on: the initiator positioning reference signal, the one or more responder positioning reference signals, the transmitted positioning reference signal, or any combination thereof. The responder device receives an initiator measurement message from the initiator device and receives one or more responder measurement messages from the one or more additional responder devices.

In a sixth aspect, a method includes receiving, by a responder device, an initiator positioning reference signal from an initiator device and receiving one or more responder positioning reference signals from one or more additional responder devices. The method includes transmitting a positioning reference signal. The method includes transmitting a measurement message comprising a first set of measurements that are determined based on: the initiator positioning reference signal, the one or more responder positioning reference signals, the transmitted positioning reference signal, or any combination thereof. The method includes receiving an initiator measurement message from the initiator device and receiving one or more responder measurement messages from the one or more additional responder devices.

In a seventh aspect, a responder device includes a wireless transceiver, memory, and one or more processors communicatively coupled to the wireless transceiver and to the memory. The one or more processors are configured to receive an initiator positioning reference signal from an initiator device and receive one or more responder positioning reference signals from one or more additional responder devices. The one or more processors are further configured to transmit a positioning reference signal and transmit a measurement message comprising a first set of measurements that are determined based on: the initiator positioning reference signal, the one or more responder positioning reference signals, the transmitted positioning reference signal, or any combination thereof. The one or more processors are further configured to receive an initiator measurement message from the initiator device and to receive one or more responder measurement messages from the one or more additional responder devices.

In an eighth aspect, a responder device includes means for receiving an initiator positioning reference signal from an initiator device and means for receiving one or more responder positioning reference signals from one or more additional responder devices. The responder device includes means for transmitting a positioning reference signal and means for transmitting a measurement message comprising a first set of measurements that are determined based on: the initiator positioning reference signal, the one or more responder positioning reference signals, the transmitted positioning reference signal, or any combination thereof. The responder device includes means for receiving an initiator measurement message from the initiator device and means for receiving one or more responder measurement messages from the one or more additional responder devices.

In a ninth aspect, an anchor device receives a plurality of measurement messages from a plurality of participants in a positioning session. The participants include an initiator device and one or more responder devices. Individual measurement messages of the plurality of measurement messages comprising a set of measurements associated with: a positioning reference signal transmitted by the initiator device and one or more responder positioning reference signals. Individual responder positioning reference signals are received from individual responder devices of the one or more responder devices. The anchor device transmits anchor map information to each participant of the plurality of participants. The anchor map information comprises one or more objects in the anchor map information that have been classified, using a machine learning algorithm of the anchor device, based at least in part on the measurement message received from each participant of the plurality of participants.

In a tenth aspect, a method includes receiving, by an anchor device, a plurality of measurement messages from a plurality of participants in a positioning session. The participants include an initiator device and one or more responder devices. Individual measurement messages of the plurality of measurement messages comprise a set of measurements associated with: a positioning reference signal transmitted by the initiator device and one or more responder positioning reference signals. Individual responder positioning reference signals are received from individual responder devices of the one or more responder devices. The method includes transmitting anchor map information to each participant of the plurality of participants. The anchor map information comprises one or more objects in the anchor map information that have been classified, using a machine learning algorithm of the anchor device, based at least in part on the measurement message received from each participant of the plurality of participants.

In an eleventh aspect, an anchor device includes a wireless transceiver, memory, and one or more processors communicatively coupled to the wireless transceiver and to the memory. The one or more processors are configured to receive a plurality of measurement messages from a plurality of participants in a positioning session. The participants include an initiator device and one or more responder devices. Individual measurement messages of the plurality of measurement messages comprising a set of measurements associated with: a positioning reference signal transmitted by the initiator device and one or more responder positioning reference signals. Individual responder positioning reference signals are received from individual responder devices of the one or more responder devices. The one or more processors are further configured to transmit anchor map information to each participant of the plurality of participants. The anchor map information comprises one or more objects in the anchor map information that have been classified, using a machine learning algorithm of the anchor device, based at least in part on the measurement message received from each participant of the plurality of participants.

In a twelfth aspect, an anchor device includes means for receiving a plurality of measurement messages from a plurality of participants in a positioning session. The participants include an initiator device and one or more responder devices. Individual measurement messages of the plurality of measurement messages comprise a set of measurements associated with: a positioning reference signal transmitted by the initiator device and one or more responder positioning reference signals. Individual responder positioning reference signals are received from individual responder devices of the one or more responder devices. The anchor device includes means for transmitting anchor map information to each participant of the plurality of participants. The anchor map information comprises one or more objects in the anchor map information that have been classified, using a machine learning algorithm of the anchor device, based at least in part on the measurement message received from each participant of the plurality of participants.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof. A more complete understanding of the present disclosure may be obtained by reference to the following Detailed Description when taken in conjunction with the accompanying Drawings. In the figures, the left-most digit(s) of a reference number identifies the figure in which the reference number first appears. The same reference numbers in different figures indicate similar or identical items.

DETAILED DESCRIPTION

Figure 1:
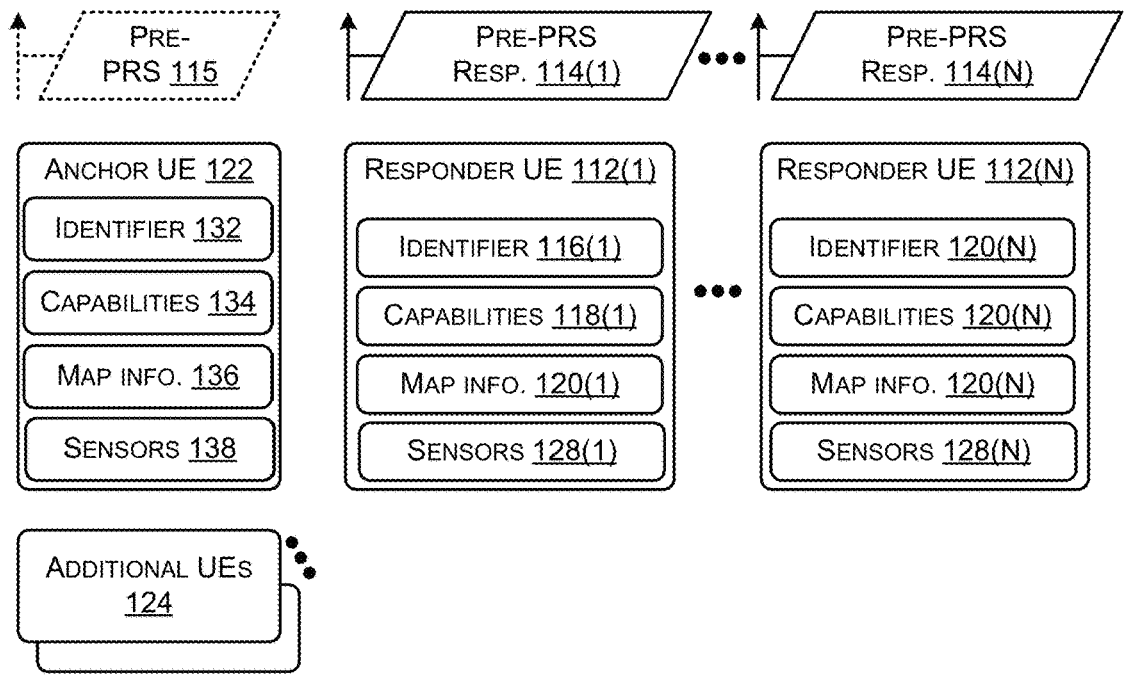
FIG. 1 is a block diagram of system that includes an initiator user equipment (UE) sending a pre-Positioning Reference Signal (pre-PRS) message, according to various aspects of the disclosure.

Disclosed are systems and techniques for a user equipment (UE) to determine map (e.g., positioning) information associated with an environment, such as, for example, which objects are line of sight (LOS), which objects are non-line of sight (NLOS), which objects are static (e.g., buildings), which objects are dynamic (e.g., vehicles, pedestrians, and the like) by gathering information from other UEs in the environment. Vehicle-to-everything (V2X) refers to the ability of a vehicle to communicate with other vehicles (e.g., vehicle-to-vehicle (V2V)) and with other UEs (e.g., vehicle to infrastructure (V2I)), such as, for example, pedestrians, cyclists, traffic lights, street lights, buildings, and so on. The systems and techniques provide a positioning system for vehicle UEs and pedestrian UEs that does not use infrastructure equipment (e.g., next generation NodeB (gNB), location management function (LMF), or the like).

A UE (e.g., a vehicle-based UE or a pedestrian-based UE) initiates a ranging session (also known as a positioning session) by broadcasting a pre-positioning reference signal (pre-PRS) signal. The initiator UE may, in some cases, use the pre-PRS request to indicate that the UE is requesting map information, including information about static reflectors, dynamic reflectors, and the like in the environment.

Nearby UEs (e.g., associated with other vehicles, pedestrians, cyclists, traffic lights, street lights, buildings, and the like) respond to receiving the pre-PRS request from the initiator UE by becoming responder UEs. An anchor UE, typically a static UE, may participate as a responder UE. The responder UEs broadcast (e.g., transmit) a pre-PRS request (e.g., without the user of a gNB, LMF, or other infrastructure equipment). The pre-PRS request exchange between the initiator UE and the responder UEs is a type of "handshake" used to establish which UEs are participating in the positioning session. The pre-PRS request may include information such as an identifier (e.g., Internet Protocol (IP) address, Medium Access Control (MAC) address, or another type of identifier associated with the sending UE, a bandwidth of the sending UE, capabilities (e.g., whether the UE is capable of storing a map) of the sending UE, whether the sending UE has map information available and the like.

After the initiator UE and responder UEs have transmitted the pre-PRS requests to determine the participating UEs, the participating UEs each transmit a PRS signal. The PRS signal is a high bandwidth pseudo-random noise (PN) sequence that enables each of the participating UEs to determine measurements associated with the PRS signal, such as, for example, a time-of-arrival (ToA) of the PRS signal, a tine-of-departure (ToD) of the PRS signal, an angle-of-arrival (AoA) of the PRS signal, an angle-of-departure (AoD) of the PRS signal, and the like. Post-PRS (e.g., after the PRS signal has been broadcast by each of the participant UEs), each of the participant UEs determine the various measurements, the PRS cycle ends with each participating UE broadcasting the measurements determined by each participating UE. For example, a particular UE of the participating UEs (i) broadcasts the ToA and AoA associated with each PRS signal received (by the particular UE) from other participating UEs and (ii) broadcasts the ToD and AoD of the PRS signal broadcast by the particular UE to the other participating UEs.

After the post-PRS messages (e.g., that include the measurements) have been broadcast, the initiator UE determines its own position with reference to the responder UEs. In addition, the responder UEs (e.g., that participated in the ranging session) determine their own position. If the initiator UE requested map information (e.g., in the pre-PRS message), then the post-PRS message of the responding UEs includes map information, such as, for example, the location of static reflectors, dynamic reflectors, and the location of the responding UE sending the post-PRS message. The anchor UE identifies the participating UEs based on the pre-PRS messages and collects map information from participating UEs using information in the post-PRS messages (e.g., broadcast by the participating UEs). The anchor UE combines the map information broadcast using the post-PRS messages and determines which objects included in the map information are dynamic and which are static.

A UE (e.g., a vehicle UE or a pedestrian UE) may be equipped with sensors (radar, lidar, and the like) that are able to detect the surrounding environment, including, for example, a location of a building and the like. The environmental information gathered by each UE using the UE's sensors is shared with other UEs to enable the other UEs to refine their own information (e.g., LOS, NLOS, static, dynamic). For example, some UEs may have the capability to gather and store environmental information based on sensor data from sensors such as lidar, radar, and the like. An anchor UE, typically a static UE (e.g., affixed to a traffic light, lamppost, building, or the like), may participate as a responder UE or the anchor UE may gather the post-PRS measurements from the participating UEs, determine updated map information, including which objects are LOS, which are NLOS, which are static (non-moving), which are dynamic (moving), and the like. The updated map information may include not just an actual map but also environment variables (e.g., PRS static reflectors, PRS dynamic reflectors) determined by sensors associated with individual responder UEs and inferred by the anchor UE. For example, the anchor UE may use machine learning, such as a classifier (e.g., support vector machine or the like), to classify objects in the map as LOS, NLOS, static, dynamic, and the like based on the map information and measurements gathered from the multiple participating UEs. The map information (including measurements) may be labeled and identified by a timestamp indicating when the map information was transmitted by a UE and an identifier (e.g., L2 identifier) associated with the UE that transmitted the map information. For example, in a V2X broadcast, a vehicle is periodically enabled to indicate whether the vehicle has map information available.

After consolidating the map information from multiple participating UEs, the anchor UE creates updated map information and sends the updated map information to the initiator UE and, in some cases, to the responding UEs, using, for example, a unicast transmission. The initiator UE and the responding UEs use the updated map information received from the anchor UE to identify which objects in the environment are static (e.g., not moving) and which are dynamic (e.g., moving).

In this way, the accuracy of UE-based V2X positioning systems is improved without the involvement of network elements, such as gNB, LMF, or the like. The map information is a consolidation of information provided by the responder UEs and by the anchor UE and may include detailed classification of objects in the environment as dynamic, static, LOS, NLOS, or the like).

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "example" and/or "example" are used herein to mean "serving as an example, instance, or illustration." Any aspect described herein as "example" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular radio access technology (RAT), unless otherwise noted. In general, a UE may be any wireless communication device (e.g., a mobile phone, router, tablet computer, laptop computer, consumer asset tracking device, wearable device (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on Institute of Electrical and Electronics Engineers (IEEE) 802.11, etc.) and so on.

A base station may operate according to one of several RATs in communication with UEs depending on the network in which it is deployed, and may be alternatively referred to as an access point (AP), a network node, a NodeB, an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems a base station may provide purely edge node signaling functions while in other systems it may provide additional control and/or network management functions. A communication link through which UEs can send radio frequency (RF) signals to a base station is called an uplink (UL) channel (e.g., a reverse traffic channel, a reverse control channel, an access channel, etc.). A communication link through which the base station can send RF signals to UEs is called a downlink (DL) or forward link channel (e.g., a paging channel, a control channel, a broadcast channel, a forward traffic channel, etc.). As used herein the term traffic channel (TCH) can refer to either an uplink/reverse or downlink/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference RF signals (or simply "reference signals") the UE is measuring. Because a TRP is the point from which a base station transmits and receives wireless signals, as used herein, references to transmission from or reception at a base station are to be understood as referring to a particular TRP of the base station.

In some implementations that support positioning of UEs, a base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal," a "radar signal," a "radio wave," a "waveform," or the like, or simply a "signal" where it is clear from the context that the term "signal" refers to a wireless signal or an RF signal.

FIG. 1 is a block diagram of a system 100 that includes an initiator user equipment (UE) sending a pre-Positioning Reference Signal (pre-PRS) message, according to various aspects of the disclosure. In the system 100, an initiator UE 102 (e.g., a vehicle, a cyclist, a pedestrian, or the like) may transmit a pre-PRS message 104. The initiator UE 102 may have an associated identifier 106 that uniquely identifies the initiator UE 102. For example, the identifier 106 may be an Internet protocol (IP) address, a medium access control (MAC) address, a serial number, a service tag, or another type of identifier that uniquely identifies the UE 102. The initiator UE 102 may have various capabilities 108 including, in some cases, a capability of gathering and storing map information 110. For example, the map information 110 may be derived from sensor data received from one or more sensors 126 associated with the initiator UE 102. The sensors 126 may include, for example, a GPS sensor, a radar sensor, a lidar sensor, an ultrasonic sensor, another type of sensor, or any combination thereof. The pre-PRS message 104 may include the identifier 106 and the capabilities 108 associated with the initiator UE 102.

Multiple UEs 112(1) to 112(N) (N>0) may respond to the pre-PRS message 104 and are referred to as responder UEs 112. Of course, in some cases, additional UEs 124 may be present but may not respond to the pre-PRS message 104. In response to receiving the pre-PRS message 104, the responder UEs 112 may each transmit a pre-PRS response 114. Each of the responder UEs 112 may include a corresponding identifier 116, capabilities 118, map information 120, and sensors 128. The identifiers 116 may uniquely identify each of the responder UEs 112. The capabilities 118 may identify various capabilities of each of the responder UEs 112, such as whether individual ones of the responder UEs 112 are capable of storing the map information 120. The map information 120 may be derived from sensor data provided by the sensors 128 (e.g., GPS sensor, radar sensor, lidar sensor, ultrasonic sensor, another type of sensor, or any combination thereof). Each of the pre-PRS responses 114 may include a corresponding identifier 116 and capabilities 118 associated with each of the responder UEs 112.

The system 100 may include an anchor UE 122. The anchor UE 122 is static and may, for example, be mounted on a traffic light, a lamp post, a building, or another nonmoving object. In some cases, the anchor UE 122 may respond to the pre-PRS message 104 by sending a pre-PRS response 115. In other cases, the anchor UE 122 may not respond to the pre-PRS message 104 with the pre-PRS response 115. The anchor UE 122 may include an identifier 132, capabilities 134, map information 136, and sensors 138.

The system 100 may include various objects including, for example, static objects such as buildings 125, and dynamic objects, such as, for example, pedestrians 127 and vehicles 130. While not illustrated, the system 100 may include other types of static and dynamic objects (e.g., cyclists, motorcyclists, people on scooters, and the like).

The pre-PRS message 104 and the subsequent pre-PRS responses 114 (and, in some cases, the pre-PRS response 115) are a type of handshake protocol used to establish participants in the PRS positioning (ranging) session. In this example, the participants in the positioning session include the initiator UE 102, the responder UEs 112, and the anchor UE 122. The pre-PRS message 104 and the pre-PRS responses 114 may be used by the initiator UE 102 and the responder UEs 112 to synchronize a particular time to transmit a PRS signal, as described in more detail in FIG. 2.

Thus, an initiator UE (e.g., associated with a vehicle or a pedestrian) may send the pre-PRS message. The pre-PRS message may include an identifier associated with the initiator UE and capabilities associated with the initiator UE, such as, for example, whether the initiator UE is capable of gathering and storing map information based on sensor data (e.g., received from sensors associated with the initiator UE). At least some of the UEs that receive the pre-PRS message may transmit a pre-PRS response and may be referred to as responder UEs. In some cases, the pre-PRS response may include an identifier that identifies the responder UE and capabilities of the responder UE, including whether the responder UE is capable of gathering and storing map information. In some cases, an anchor UE may respond to the pre-PRS message while in other cases, the anchor UA may not respond to the pre-PRS message.

Figure 2:
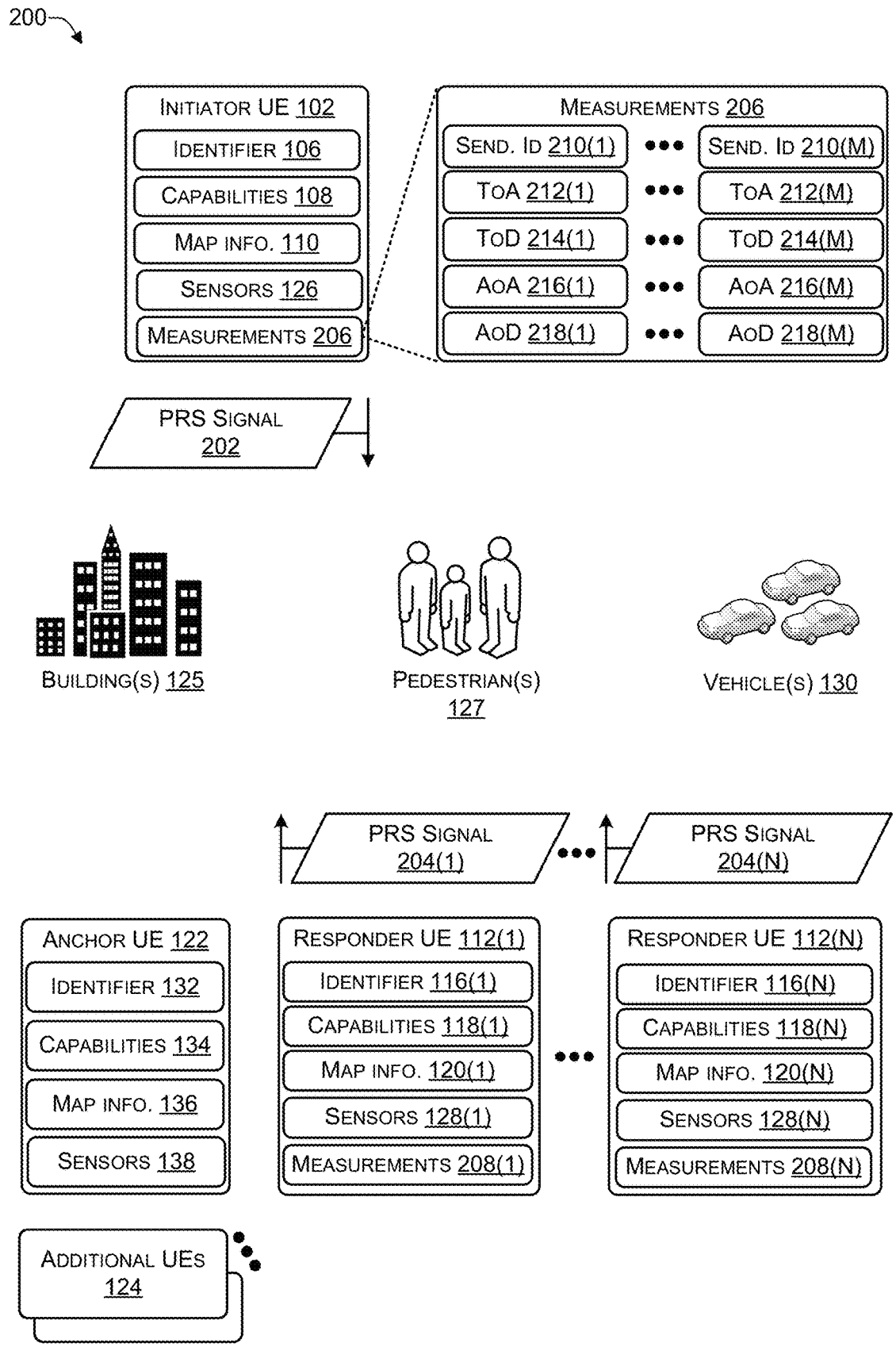
FIG. 2 is a block diagram of system that includes an initiator UE transmitting a PRS signal, according to various aspects of the disclosure.

FIG. 2 is a block diagram of system 200 that includes an initiator UE transmitting a PRS signal, according to various aspects of the disclosure. In the system 200, the initiator UE 102 transmits the PRS signal 202. Each of the responder UEs 112 transmits a corresponding PRS signal 204. Each of the PRS signals 202, 204 is a high bandwidth pseudo-random noise sequence designed to enable the UEs 102, 112 to measure time-of-arrival (ToA), time-of-departure (ToD), angle-of-arrival (AoA), angle-of-departure (AoD), and the like.

Each particular UE of the UEs 102, 112 knows the ToD and AoD of the PRS signal that the particular UE transmitted and is able to determine the ToA and AoA of the PRS signals that each of the other UEs transmitted. For example, the initiator UE 102 knows the ToD and AoD of the PRS signal 202 and the responder UE 112(N) knows the ToD and AoD of the PRS signal 204(N). Each UE is able to determine the ToA and AoA of each PRS signal received. For example, the initiator UE 102 is able to calculate (e.g., determine) the ToA and AoA of each of the PRS signals 204(1) to 204(N) and the responder UEs 112 are each able to determine the ToA and AoA of the PRS signal 202. In this way, the initiator UE 102 is able to determine a portion the measurements 206, and each of the responder UEs 112 is able to determine a portion of the measurements 208. The UEs 102, 112 exchange measurements with each other, as discussed in more detail in FIG. 4, enabling the UEs 102, 112 to determines all of the measurements 206, 208.

For example, the measurements 206 may include a sender identifier 210(1) to 210(M) (where 0<M<=N), ToA 212(1) to ToA 212(M), ToD 214(1) to ToD 214(M), AoA 216(1) to AoA 216(M), and AoD 218(1) to AoD 218(M). Prior to exchanging the measurements 206, 208 with the UEs 112, the measurements 206 include the ToD 214 and AoD 218 associated with the PRS signal 202 and the ToA 212 and AoA 216 associated with each of the PRS signals 204.

The sender identifiers 210(1) to 210(M) may be a subset of the identifiers 116 (e.g., 0<M<=N) because the initiator UE 102 may not receive all N of the PRS signals 204(1) to PRS(N) due to reflection, blockage, or other signal interference.

Figure 3:
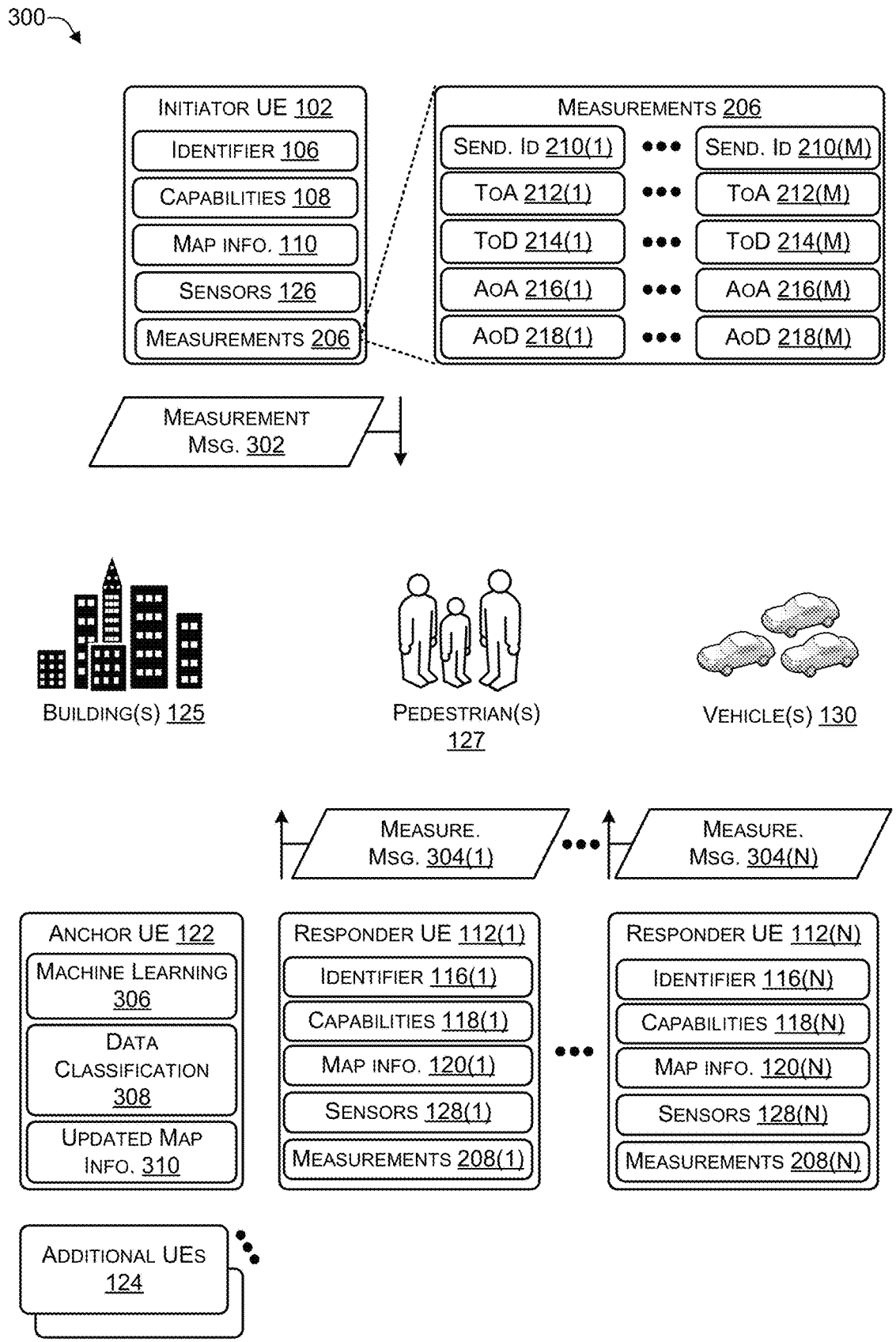
FIG. 3 is a block diagram of system that includes responder UEs transmitting measurements, according to various aspects of the disclosure.

FIG. 3 is a block diagram of system 300 that includes responder UEs transmitting measurements, according to various aspects of the disclosure. In the system 300, the initiator UE 102 may send the measurement message 302 that includes at least a portion of the measurements 206. For example, the measurements 206 may include the ToD 214 and AoD 218 associated with the PRS signal 202 and the ToA 212 and AoA 216 associated with each of the PRS signals 204. The responder UE 112(1) sends the measurement message 304(1) that includes the measurements 208(1) and the responder UE 112(N) sends the measurement message 304(N) that includes the measurements 208(N). The measurements 208(N) may include the ToD and AoD associated with the PRS signal 204(N), the ToA and AoA associated with the PRS signal 202, and the ToA and AoA associated with each of the PRS signals 204(1) to 204(N−1). In some cases, the measurement message 302 may include the map information 110 and the measurement messages 304 may include the map information 120.

By sending the measurement messages 302, 304 to each other, the UEs 102, 112 are able to complete the second set of (e.g., remaining) measurements in the measurements 206, 208. For example, the initiator UE 102 is able to calculate (e.g., determine) the ToA 212 and AoA 216 of each of the PRS signals 204(1) to 204(N) of FIG. 2 and the responder UEs 112 are each able to determine the ToA and AoA of the PRS signal 202.

The anchor UE 122 may receive the measurement message 302 transmitted by the initiator UE 102 and the measurement messages 304 transmitted by the responder UEs 112. In some cases, the anchor UE 122 may receive the map information 110, 120 in the measurement messages 302, 304. The anchor UE 122 may use machine learning 306 (e.g., a classifier such as, for example, a support vector machine) to perform data classification 308 on the measurements 206, 208 provided by the measurement messages 302, 304. The anchor UE 122 may update map information 136 of FIGS. 1 and 2 to create updated map information 310 based on the measurements 206, 208 and, in some cases the map information 110, 120, provided in the measurement messages 302, 304. In this way, the anchor UE 122 is able to use the measurements 206, 208 and, in some cases, the map information 110, 120 stored by each of the UEs 102, 112, to create the updated map information 310. The updated map information 310 may include much more accurate information as compared to the map information 136.

Thus, an anchor UE may participate or monitor a positioning session between an initiator UE and responder UEs. After participating UEs (e.g., the initiator UE, the responder UEs and, in some cases, the anchor UE) have transmitted the PRS signal, the participating UEs determine various measurements (e.g., ToA, AoA and the like) associated with the PRS signal. The participating UEs transmit the measurements (including measurements associated with their own PRS signal, such as ToD, AoD) to other participating UEs. In some cases, the measurements may include map information local to each participating UE. The anchor UE uses the measurements from each of the participating UEs to update (e.g., increase an accuracy of) of map information stored by the anchor UE. The anchor UE sends the updated map information to the initiator UE and, in some cases, the responder UEs, as described in more detail in FIG. 4.

Figure 4:
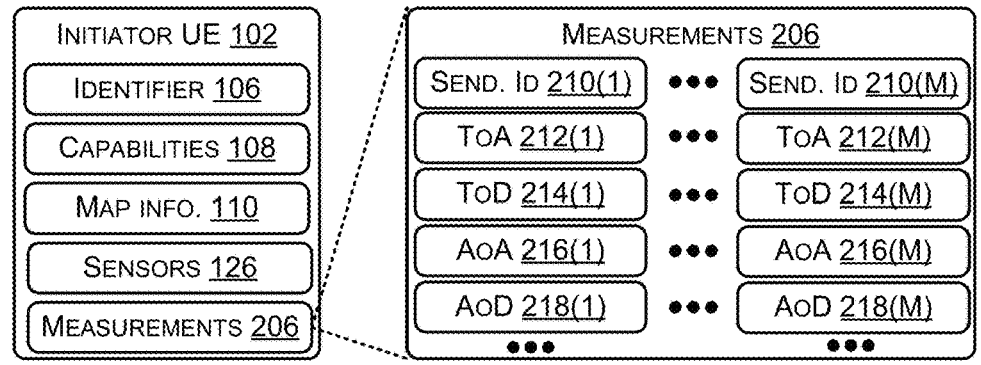
FIG. 4 is a block diagram of system that includes an anchor UE sending updated map information, according to various aspects of the disclosure.
Figure 4:
Figure 4:
Figure 4:
Figure 4:
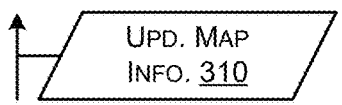
Figure 4:
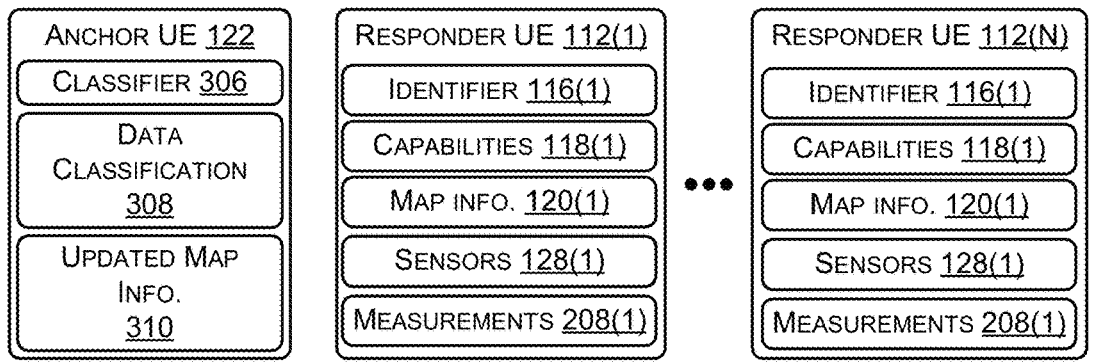
Figure 4:
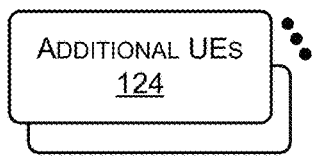

FIG. 4 is a block diagram of system 400 that includes an anchor UE sending updated map information, according to various aspects of the disclosure. After the anchor UE 122 has created the updated map information 310, including using the machine learning 306 to classify objects in the updated map information 310 as LOS, NLOS, static, dynamic, and the like, the anchor UE 122 transmits the updated map information 310 to the initiator UE 102, and in some cases, the responder UEs 112. The anchor UE 122 may transmit the updated map information 310 using a unicast (or similar) message. In this way, the initiator UE 102 is able to obtain the updated map information 310 using other UEs (e.g., UEs 112, 122) that are located nearby (e.g., sufficiently near to receive and respond to the pre-PRS message 104. An advantage of this approach is that the initiator UE 102 is able to obtain the updated map information 310 without the use of network infrastructure equipment, such as, for example, gNB, LMF, or the like. Thus, the systems and techniques described herein can be used in situations where network infrastructure equipment is unavailable to provide detailed map information.

Technical advantages of the systems and techniques described herein include improving an accuracy of UE-based V2X positioning systems without the involvement of network elements, such as gNB, LMF, or the like. The initiator is able to obtain map information provided by the responder UEs and by the anchor UE that may include detailed classification of objects in the environment as dynamic, static, LOS, NLOS, or the like) to aid in navigation.

Figure 5:
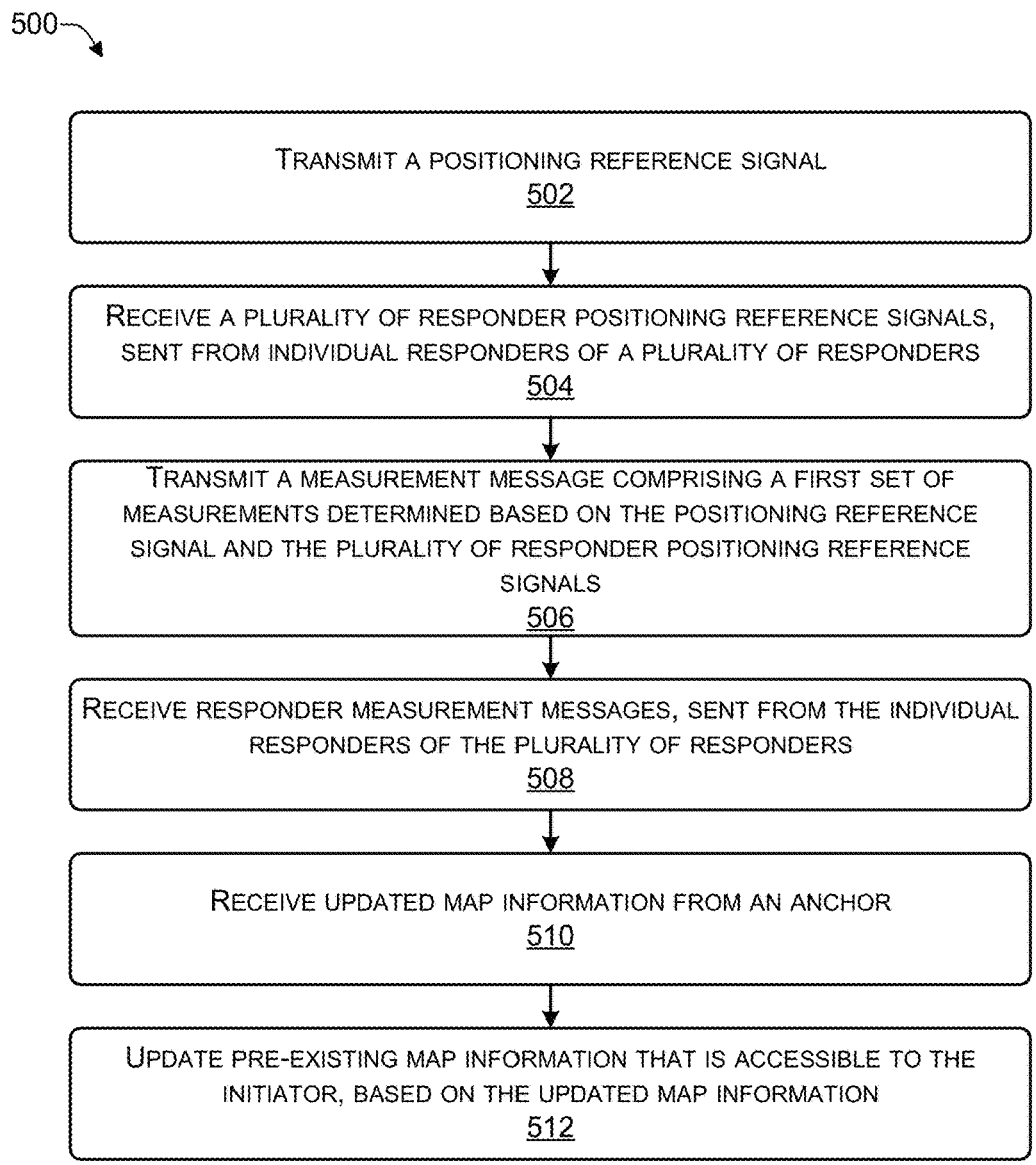
FIG. 5 illustrates an example process that includes transmitting (e.g., by an initiator UE) a PRS signal, according to aspects of the disclosure.
Figure 6:
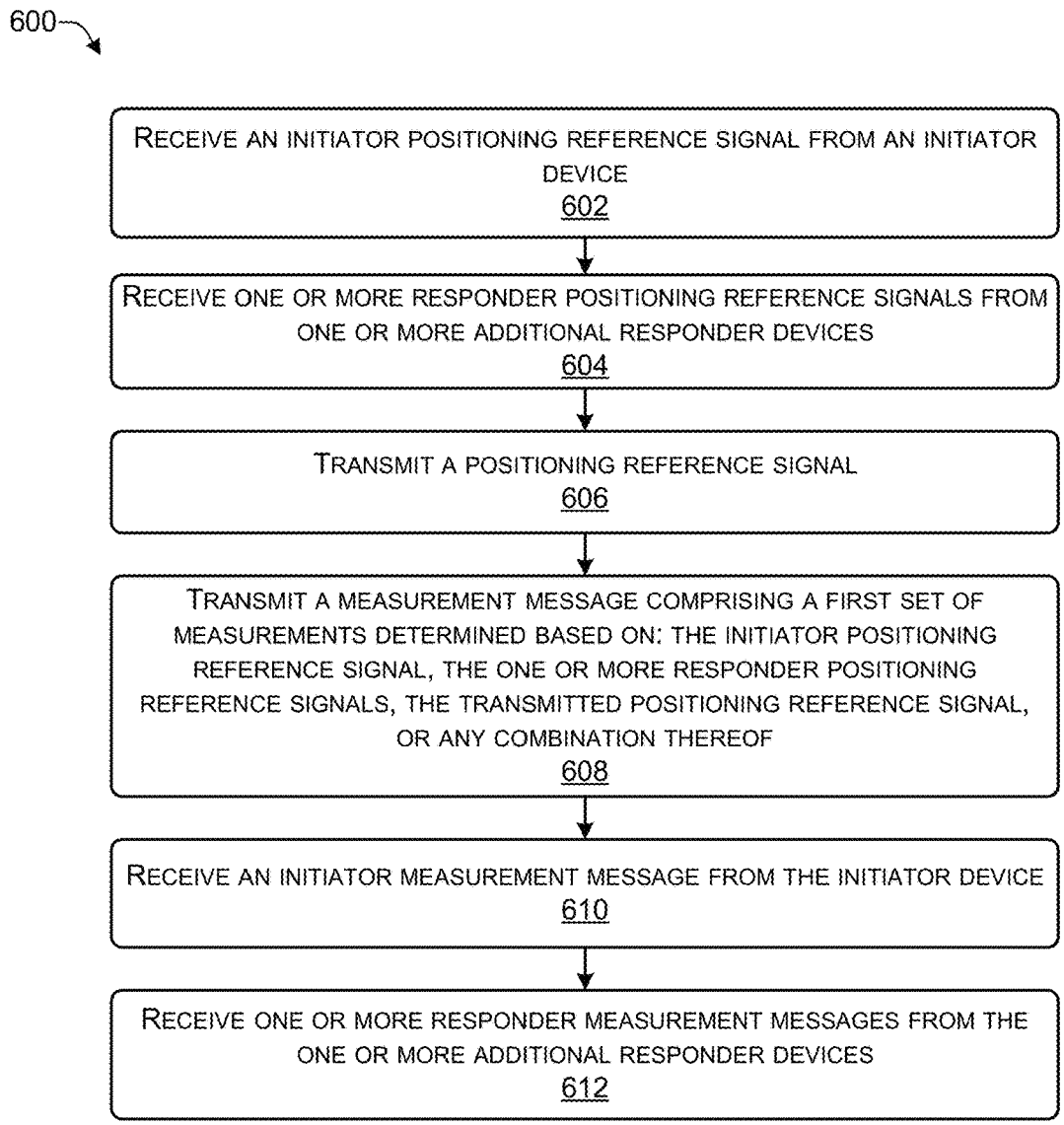
FIG. 6 illustrates an example process that includes transmitting (e.g., by a responder UE) a responder PRS signal, according to aspects of the disclosure.
Figure 7:
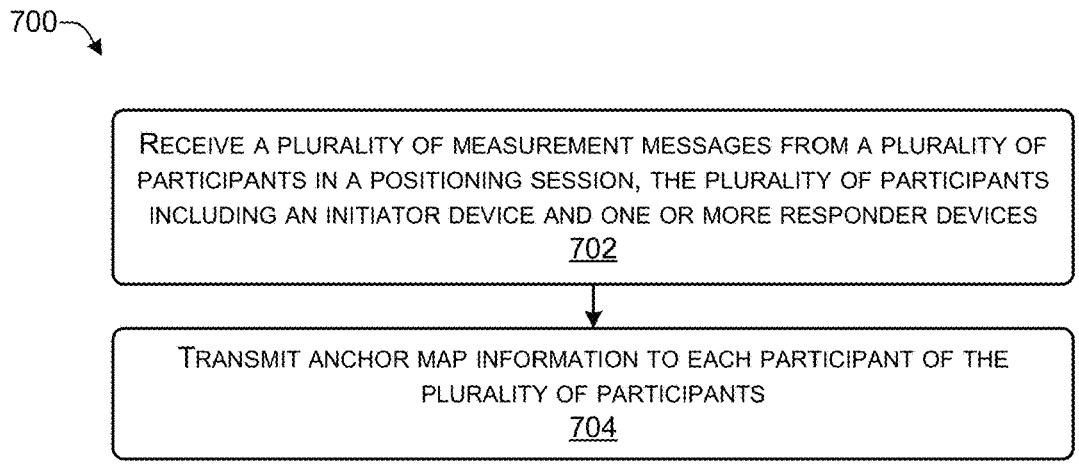
FIG. 7 illustrates an example process that includes transmitting (e.g., by an anchor UE) updated map information, according to aspects of the disclosure.

In the flow diagrams of FIGS. 5, 6, and 7, each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. For discussion purposes, the processes 500, 600, and 600 are described with reference to FIGS. 1, 2, 3, and 4 as described above, although other models, frameworks, systems, and environments may be used to implement these processes.

FIG. 5 illustrates an example process 500 that includes transmitting (e.g., by an initiator UE) a PRS signal, according to aspects of the disclosure. The process 500 may be performed by the initiator UE 102 of FIGS. 1, 2, 3, and 4.

At 502, the process 500 transmits a PRS signal. At 504, the process 500 receives a plurality of responder positioning reference signals sent from individual responders of a plurality of responders. For example, in FIG. 1, the initiator UE 102 may transmit the pre-PRS message 104 and, in response, the responder UEs 112 may transmit the pre-PRS response 114. In some cases, the anchor UE 122 may send the pre-PRS response 115. In this way, the participant UEs in the ranging session are established. Not all UEs may respond. For example, the additional UEs 124 may not respond to the pre-PRS message 104. In FIG. 2, the initiator UE 102 transmits the PRS signal 202 and individual UEs of the responder UEs 112 transmit a corresponding PRS signal 204. The initiator UE 102 receives at least a portion of the PRS signals 204(1) to 204(N) transmitted by the responder UEs 112(1) to 112(N).

At 506, the process 500 transmits a measurement message comprising a first set of measurements determined based on the PRS signal and the plurality of responder positioning reference signals. At 508, the process 500 receives responder measurement messages, sent from the individual responders of the plurality of responders. For example, in FIG. 3, the initiator UE 102 determines at least a portion of the measurements 206, e.g., the ToD, AoD of the PRS signal 202 and the ToA, AoA of the PRS signals 204(1) to 204(N) received from the responder UEs 112(1) to 112(N). The initiator UE 102 sends the measurement message 302 to the responder UEs 112. The measurement message 302 includes the ToD, AoD associated with the PRS signal 202 and the ToA, AoA associated with each of the PRS signals 204. Each of the responder UEs 112 send a corresponding measurement message 304. For example, the responder UE 112(N) sends the measurement message 304(N) that includes the ToD, AoD of the PRS signal 204(N), the ToA, AoA of the PRS signal 202, and the ToA, AoA of each of the PRS signals 204(1) to 204(N−1). In this way, the initiator UE 102 has the measurements 206 that include the ToA, ToD, AoA, AoD associated with each of the PRS signals 204 and each responder UE 112 has the measurements 208 that include the ToA, ToD, AoA, AoD associated with the PRS signal 202 and others of the PRS signals 204. In some cases, the measurement message 302 may include the map information 110, and each of the measurement messages 304 may include the map information 120. In this way, the participants in the ranging session share the different measurements (and map information) with each other and with the anchor UE 122.

At 510, the process 500 receives, updated map information from an anchor. At 512, the process 500 may update pre-existing map information that is accessible to the initiator, based on the updated map information. For example, in FIG. 4, the anchor UE 122 may receive the measurement message 302 transmitted by the initiator UE 102 and the measurement messages 304 transmitted by the responder UEs 112. In some cases, the anchor UE 122 may receive the map information 110, 120 in the measurement messages 302, 304, respectively. The anchor UE 122 may use machine learning 306 (e.g., a classifier) to perform data classification 308 on the measurements 206, 208 provided by the measurement messages 302, 304. The anchor UE 122 may update the map information 136 to create the updated map information 310 based on the measurements 206, 208 and, in some cases, the map information 110, 120, provided in the measurement messages 302, 304. The updated map information 310 may include much more accurate information as compared to the map information 136.

Thus, an initiator UE is able to obtain updated map information from nearby UEs without the use of network infrastructure equipment, such as, for example, a gNB, an LMF, or the like.

FIG. 6 illustrates an example process 600 that includes transmitting (e.g., by a responder UE) a responder PRS signal, according to aspects of the disclosure. The process 600 may be performed by individual ones of the responder UEs 112 of FIGS. 1, 2, 3, and 4.

At 602, the process 600 receives an initiator positioning reference signal from an initiator device. At 604, the process 600 receives one or more responder positioning reference signals from one or more additional responder devices. At 606, the process 600 transmits a positioning reference signal. For example, in FIG. 1, each of the responder UEs 112 may receive the pre-PRS message 104 and in response, each of the responder UEs 112 may send the pre-PRS response 114. The transmission of the pre-PRS messages 104, 114 may be used as a type of handshake that occurs prior to the PRS signaling and establishes the participating UEs in the ranging session. In FIG. 2, each of the responder UEs 112 receives the PRS signal 202 from the initiator UE 102 and from others of the UEs 112. Each of the responder UEs 112 transmits the corresponding PRS signal 204. For example, the responder UE 112(N) receives the PRS signal 202 from the initiator UE 102 and the PRS signals 204(1) to 204(N−1) from the responder UEs 112(1) to 112(N−1), respectively. The responder UE 112(N) transmits the PRS signal 204(N) to other UEs participating in the ranging (e.g., positioning) session.

At 608, the process 600 transmits a measurement message comprising a first set of measurements determined based on: the initiator positioning reference signal, the one or more responder positioning reference signals, the transmitted positioning reference signal, or any combination thereof. At 610, the process 600 receives an initiator measurement message from the initiator device. At 612, the process 600 receives one or more responder measurement messages from the one or more additional responder devices. For example, the responder UE 112(N) determines the ToD, AoD associated with the PRS signal 204(N), determines the ToA, AoA associated with the PRS signal 202, and determines the ToA, AoA associated with the other PRS signals 204(1) to 204(N−1). The responder UE 112(N) sends these measurements in the measurement message 304(N) to the initiator UE 102 and the other UEs 112(1) to 112(N−1). The responder UE 112(N) receives measurements 206 in the measurement messages 302 from the initiator UE 102 and receives the measurements 208(1) to 208(N−1) in the measurement messages 304(1) to 304(N−1) from the other UEs 112(1) to 112(N−1), respectively. Based on the measurements 206, 208(1) to 208(N−1), the UE 112(N) determines the remaining of the measurements 208(N), e.g., the ToD, AoD of the PRS signal 202, the ToD, AoD of the PRS signals 204(1) to 204(N−1), and the ToA, AoA of the PRS signal 204(N) at the initiator UE 102 and at each of the other UEs 112(1) to 112(N−1). In some cases, the measurement messages 302, 304 received from the initiator UE and from the other responder UEs 112(1) to 112(N−1) may include the map information 110 and the map information 120(1) to 120(N−1), respectively.

FIG. 7 illustrates an example process 700 that includes transmitting (e.g., by an anchor UE) updated map information to an initiator UE, according to aspects of the disclosure. The process 700 may be performed by the anchor UE 122 of FIGS. 1, 2, 3, and 4.

At 702, the process 700 receives a plurality of measurement messages from a plurality of participants in a positioning session, the plurality of participants including an initiator device and one or more responder devices. For example, in FIG. 1, the anchor UE 122 determines that the initiator UE 102 has sent the pre-PRS message 104 and from individual ones of multiple the responder UEs 112 have each sent the corresponding pre-PRS response 114. In some cases, the anchor UE 122 may transmit the pre-PRS response 115, while in other cases the UE 122 may not transmit the pre-PRS response 115. In FIG. 3, the anchor UE 122 receives the measurement message 302 from the initiator UE 102 and the measurement messages 304 from individual ones of the responder UEs 112. The measurement message 302 may include the measurements 206. In some cases, the measurement message 302 may include the map information 110. Each of the measurement messages 304 may include the corresponding measurements 208. In some cases, the measurement messages 304 may include the corresponding map information 120.

At 704, the process 700 transmits anchor map information to each participant of the plurality of participants. The anchor map information (e.g., updated map information) is created based on the measurement messages, where the updated map information includes objects classified as line of sight (LOS), non-LOS (NLOS), static, dynamic, or the like. For example, in FIG. 3, the anchor UE 122 updates the map information 136 based on the measurement messages 302, 304 to create the updated map information 310. The anchor UE 122 may use the machine learning 306 to perform the data classification 308 to classify at least a portion of the objects in the updated map information 310. For example, objects in the updated map information 310 may be classified as LOS, NLOS, static, dynamic, or another attribute. In FIG. 4, the anchor UE 122 broadcasts the updated map information 310 to the initiator UE 102 and, in some cases, to the responder UEs 112. The anchor UE 122 may broadcast the updated map information 310 using a unicast (or similar) message.

Thus, an anchor UE may determine that an initiator UE has sent a pre-PRS message to initiate a positioning session. After the initiator UE and the responder UEs have each transmitted a PRS signal, performed measurements, and broadcast measurement messages that include the measurements, the anchor UE may receive the measurement messages and update map information that the anchor UE has stored locally to create updated map information. Based on the measurements, the anchor UE may use machine learning to classify one or more objects in the map as LOS, NLOS, dynamic, static, or the like. The anchor UE transmits the updated map information to the initiator UE, and in some cases, to the responder UEs, via for example a unicast message. In this way, the initiator UE and the responder UEs receive updated map information without using a network component such as, for example, a gNB, LMF, or the like.

Technical advantages of the systems and techniques described herein include improving an accuracy of UE-based V2X positioning systems without the involvement of network elements, such as gNB, LMF, or the like. The initiator is able to obtain map information provided by the responder UEs and by the anchor UE that may include detailed classification of objects in the environment as dynamic, static, LOS, NLOS, or the like) to aid in navigation.

Figure 8A:
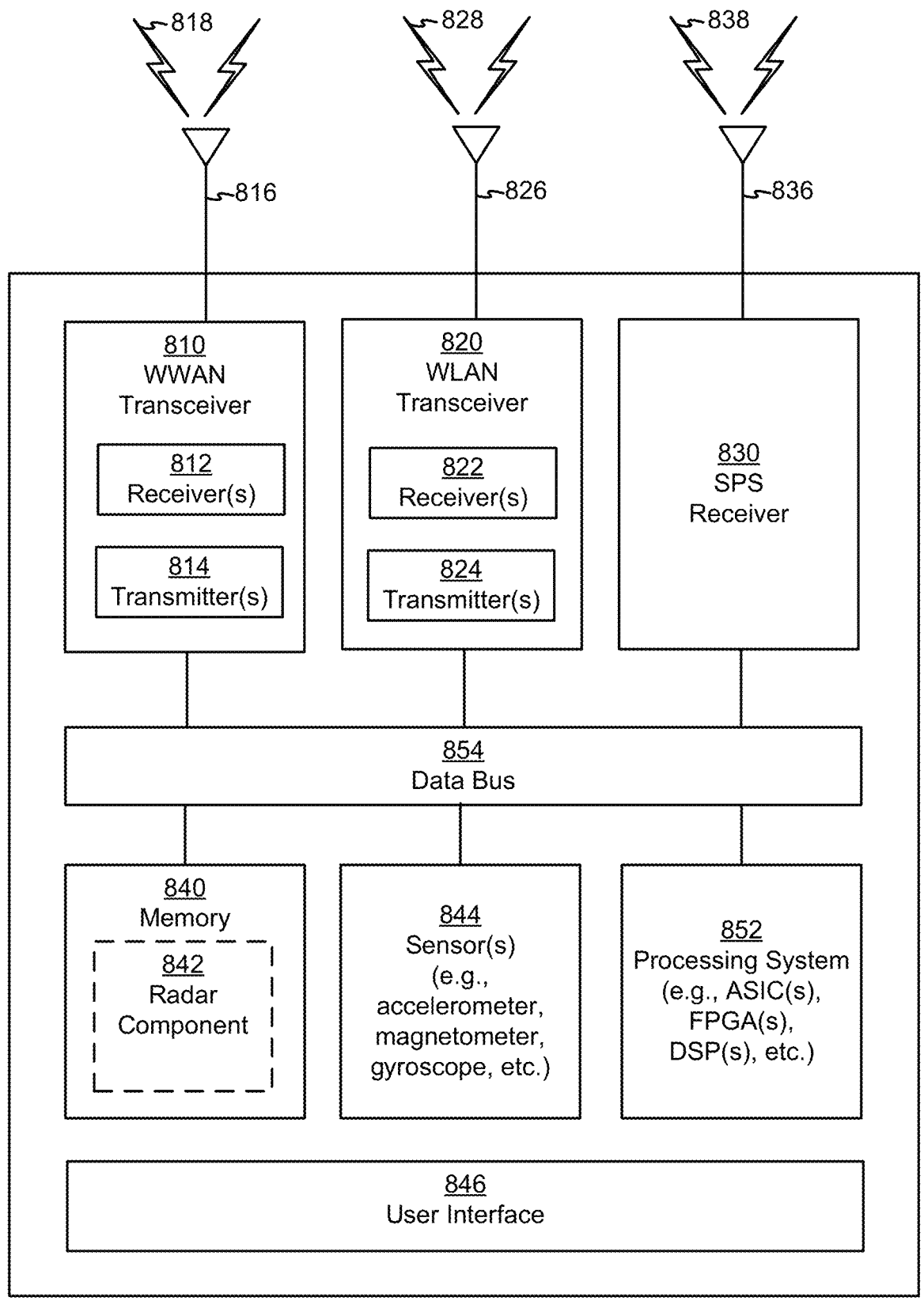
FIGS. 8A and 8B are simplified block diagrams of several sample aspects of components that may be employed in wireless communication nodes and configured to support communication as described herein.
Figure 8B:
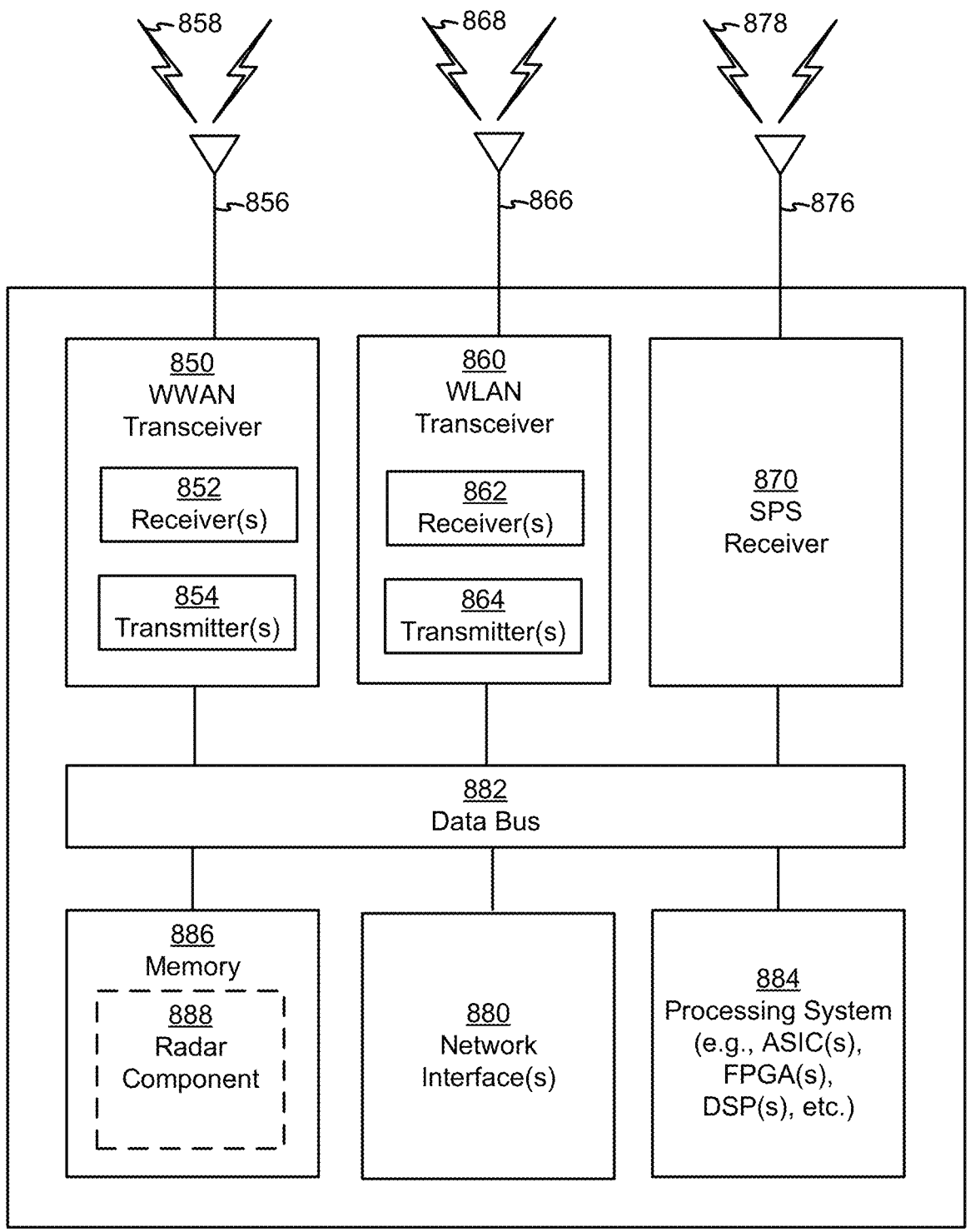

Referring to FIGS. 8A and 8B, several example components (represented by corresponding blocks) that may be incorporated into a UE, a base station (which may correspond to any of the base stations described herein), and a network entity (which may correspond to or embody any of the network functions described herein) to support the file transmission operations are shown. It will be appreciated that these components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The UE, base station, or network entity may include wireless wide area network (WWAN) transceiver 810 and 850, respectively, configured to communicate via one or more wireless communication networks (not shown), such as an NR network, a Long-Term Evolution (LTE) network, a global system for mobile communication (GSM) network, and/or the like. The WWAN transceivers 810 and 850 may be connected to one or more antennas 816 and 856, respectively, for communicating with other network nodes, such as other UEs, access points, base stations (e.g., eNBs, gNBs), etc., via at least one designated RAT (e.g., NR, LTE, GSM, etc.) over a wireless communication medium of interest (e.g., some set of time/frequency resources in a particular frequency spectrum). The WWAN transceivers 810 and 850 may be variously configured for transmitting and encoding signals 818 and 858 (e.g., messages, indications, information, and so on), respectively, and, conversely, for receiving and decoding signals 818 and 858 (e.g., messages, indications, information, pilots, and so on), respectively, in accordance with the designated RAT. Specifically, the transceivers 810 and 850 include one or more transmitters 814 and 854, respectively, for transmitting and encoding signals 818 and 858, respectively, and one or more receivers 812 and 852, respectively, for receiving and decoding signals 818 and 858, respectively.

The UE and the base station also include, at least in some cases, wireless local area network (WLAN) transceivers 820 and 860, respectively. The WLAN transceivers 820 and 860 may be connected to one or more antennas 826 and 866, respectively, for communicating with other network nodes, such as other UEs, access points, base stations, etc., via at least one designated RAT (e.g., WiFi, LTE Direct (LTE-D), Bluetooth®, etc.) over a wireless communication medium of interest. The WLAN transceivers 820 and 860 may be variously configured for transmitting and encoding signals 828 and 868 (e.g., messages, indications, information, and so on), respectively, and, conversely, for receiving and decoding signals 828 and 868 (e.g., messages, indications, information, pilots, and so on), respectively, in accordance with the designated RAT. Specifically, the transceivers 820 and 860 include one or more transmitters 824 and 864, respectively, for transmitting and encoding signals 828 and 868, respectively, and one or more receivers 822 and 862, respectively, for receiving and decoding signals 828 and 868, respectively.

Transceiver circuitry including at least one transmitter and at least one receiver may comprise an integrated device (e.g., embodied as a transmitter circuit and a receiver circuit of a single communication device) in some implementations, may comprise a separate transmitter device and a separate receiver device in some implementations, or may be embodied in other ways in other implementations. In an aspect, a transmitter may include or be coupled to a plurality of antennas (e.g., antennas 816, 826, 856, 866), such as an antenna array, that permits the respective apparatus to perform transmit "beamforming," as described herein. Similarly, a receiver may include or be coupled to a plurality of antennas (e.g., antennas 816, 826, 856, 866), such as an antenna array, that permits the respective apparatus to perform receive beamforming, as described herein. In an aspect, the transmitter and receiver may share the same plurality of antennas (e.g., antennas 816, 826, 856, 866), such that the respective apparatus can only receive or transmit at a given time, not both at the same time. A wireless communication device (e.g., one or both of the transceivers 810 and 820 and/or 850 and 860) of the UE and/or the base station may also comprise a network listen module (NLM) or the like for performing various measurements.

The UE and the base station may include, at least in some cases, satellite positioning systems (SPS) receivers 830 and 870. The SPS receivers 830 and 870 may be connected to one or more antennas 836 and 876, respectively, for receiving SPS signals 838 and 878, respectively, such as global positioning system (GPS) signals, global navigation satellite system (GLONASS) signals, Galileo signals, Beidou signals, Indian Regional Navigation Satellite System (NAVIC), Quasi-Zenith Satellite System (QZSS), etc. The SPS receivers 830 and 870 may comprise any suitable hardware and/or software for receiving and processing SPS signals 838 and 878, respectively. The SPS receivers 830 and 870 request information and operations as appropriate from the other systems, and performs calculations necessary to determine positions of the UE and the base station using measurements obtained by any suitable SPS algorithm.

The base station and the network entity may each include at least one network interface 880 for communicating with other network entities. For example, the network interfaces 880 (e.g., one or more network access ports) may be configured to communicate with one or more network entities via a wire-based or wireless backhaul connection. In some aspects, the network interfaces 880 may be implemented as transceivers configured to support wire-based or wireless signal communication. This communication may involve, for example, sending and receiving messages, parameters, and/or other types of information.

The UE, the base station, and the network entity may include other components that may be used in conjunction with the operations as disclosed herein. The UE may include processor circuitry implementing a processing system 832 for providing functionality relating to, for example, RF sensing, and for providing other processing functionality. The base station may include a processing system 884 for providing functionality relating to, for example, RF sensing as disclosed herein, and for providing other processing functionality. The network entity may include a processing system for providing functionality relating to, for example, Wi-Fi radar or RF sensing as disclosed herein, and for providing other processing functionality. In an aspect, the processing systems 832, 884 may include, for example, one or more general purpose processors, multi-core processors, ASICs, digital signal processors (DSPs), field programmable gate arrays (FPGA), or other programmable logic devices or processing circuitry.

The UE, the base station, and the network entity may include memory circuitry implementing memory components 840, 886 (e.g., each including a memory device), respectively, for maintaining information (e.g., information indicative of reserved resources, thresholds, parameters, and so on). In some cases, the UE, the base station, and the network entity may include radar components 842, 888, respectively. The radar components 842, 888 may be hardware circuits that are part of or coupled to the processing systems 832, 884 respectively, that, when executed, cause the UE, the base station, and the network entity to perform the functionality described herein. In other aspects, the radar components 842, 888 may be external to the processing systems 832, 884 (e.g., part of a modem processing system, integrated with another processing system, etc.). Alternatively, the radar components 842, 888 may be memory modules (as shown in FIGS. 8A, 8B) stored in the memory components 840, 886 respectively, that, when executed by the processing systems 832, 884 (or a modem processing system, another processing system, etc.), cause the UE, the base station, and the network entity to perform the functionality described herein.

The UE may include one or more sensors 844 coupled to the processing system 832 to provide movement and/or orientation information that is independent of motion data derived from signals received by the WWAN transceiver 810, the WLAN transceiver 820, and/or the SPS receiver 830. By way of example, the sensor(s) 844 may include an accelerometer (e.g., a micro-electrical mechanical systems (MEMS) device), a gyroscope, a geomagnetic sensor (e.g., a compass), an altimeter (e.g., a barometric pressure altimeter), and/or any other type of movement detection sensor. Moreover, the sensor(s) 844 may include a plurality of different types of devices and combine their outputs in order to provide motion information. For example, the sensor(s) 844 may use a combination of a multi-axis accelerometer and orientation sensors to provide the ability to compute positions in 2D and/or 3D coordinate systems.

In addition, the UE may include a user interface 846 for providing indications (e.g., audible and/or visual indications) to a user and/or for receiving user input (e.g., upon user actuation of a sensing device such a keypad, a touch screen, a microphone, and so on). Although not shown, the base station and the network entity may also include user interfaces.

Referring to the processing system 884 in more detail, in the downlink, IP packets from the network entity may be provided to the processing system 884. The processing system 884 may implement functionality for a radio resource control (RRC) layer, a packet data convergence protocol (PDCP) layer, a radio link control (RLC) layer, and a medium access control (MAC) layer. The processing system 884 may provide RRC layer functionality associated with broadcasting of system information (e.g., master information block (MIB), system information blocks (SIBs)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through automatic repeat request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmitter 854 and the receiver 852 may implement Layer-1 functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The transmitter 854 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM symbol stream is spatially precoded to produce multiple spatial streams. Channel estimates from a channel estimator may be used to determine the coding and modulation scheme, as well as for spatial processing. The channel estimate may be derived from a reference signal and/or channel condition feedback transmitted by the UE. Each spatial stream may then be provided to one or more different antennas 856. The transmitter 854 may modulate an RF carrier with a respective spatial stream for transmission.

At the UE, the receiver 812 receives a signal through its respective antenna(s) 816. The receiver 812 recovers information modulated onto an RF carrier and provides the information to the processing system 832. The transmitter 814 and the receiver 812 implement Layer-1 functionality associated with various signal processing functions. The receiver 812 may perform spatial processing on the information to recover any spatial streams destined for the UE. If multiple spatial streams are destined for the UE, they may be combined by the receiver 812 into a single OFDM symbol stream. The receiver 812 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station. These soft decisions may be based on channel estimates computed by a channel estimator. The soft decisions are then decoded and de-interleaved to recover the data and control signals that were originally transmitted by the base station on the physical channel. The data and control signals are then provided to the processing system 832, which implements Layer-3 and Layer-2 functionality.

In the uplink, the processing system 832 provides demultiplexing between transport and logical channels, packet reassembly, deciphering, header decompression, and control signal processing to recover IP packets from the core network. The processing system 832 is also responsible for error detection.

Similar to the functionality described in connection with the downlink transmission by the base station, the processing system 832 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through hybrid automatic repeat request (HARM), priority handling, and logical channel prioritization.

Channel estimates derived by the channel estimator from a reference signal or feedback transmitted by the base station may be used by the transmitter 814 to select the appropriate coding and modulation schemes, and to facilitate spatial processing. The spatial streams generated by the transmitter 814 may be provided to different antenna(s) 816. The transmitter 814 may modulate an RF carrier with a respective spatial stream for transmission.

The uplink transmission is processed at the base station in a manner similar to that described in connection with the receiver function at the UE. The receiver 852 receives a signal through its respective antenna(s) 856. The receiver 852 recovers information modulated onto an RF carrier and provides the information to the processing system 884.

In the uplink, the processing system 884 provides demultiplexing between transport and logical channels, packet reassembly, deciphering, header decompression, control signal processing to recover IP packets from the UE. IP packets from the processing system 884 may be provided to the core network. The processing system 884 is also responsible for error detection.

For convenience, the UE, the base station, and/or the network entity are shown in FIGS. 8A, 8B as including various components that may be configured according to the various examples described herein. It will be appreciated, however, that the illustrated blocks may have different functionality in different designs.

The various components of the UE, the base station, and the network entity may communicate with each other over data buses 834, 882 respectively. The components of FIGS. 8A, 8B may be implemented in various ways. In some implementations, the components of FIGS. 8A, 8B may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 810 to 846 may be implemented by processor and memory component(s) of the UE (e.g., by execution of appropriate code and/or by appropriate configuration of processor components). Similarly, some or all of the functionality represented by blocks 850 to 888 may be implemented by processor and memory component(s) of the base station (e.g., by execution of appropriate code and/or by appropriate configuration of processor components). For simplicity, various operations, acts, and/or functions are described herein as being performed "by a UE," "by a base station," "by a positioning entity," etc. However, as will be appreciated, such operations, acts, and/or functions may actually be performed by specific components or combinations of components of the UE, base station, positioning entity, etc., such as the processing systems 832, 884 the transceivers 810, 820, 850, and 860, the memory components 840, 886 the radar components 842, 888 etc.

It can be noted that, although particular frequencies, integrated circuits (ICs), hardware, and other features are described in the aspects herein, alternative aspects may vary. That is, alternative aspects may utilize additional or alternative frequencies (e.g., other the 60 GHz and/or 28 GHz frequency bands), antenna elements (e.g., having different size/shape of antenna element arrays), scanning periods (including both static and dynamic scanning periods), electronic devices (e.g., WLAN APs, cellular base stations, smart speakers, IoT devices, mobile phones, tablets, personal computer (PC), etc.), and/or other features. A person of ordinary skill in the art will appreciate such variations.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of A, B, or C" or "one or more of A, B, or C" or "at least one of the group consisting of A, B, and C" used in the description or the claims means "A or B or C or any combination of these elements." For example, this terminology may include A, or B, or C, or A and B, or A and C, or A and B and C, or 2A, or 2B, or 2C, and so on.

In the detailed description above it can be seen that different features are grouped together in examples. This manner of disclosure should not be understood as an intention that the example clauses have more features than are explicitly mentioned in each clause. Rather, the various aspects of the disclosure may include fewer than all features of an individual example clause disclosed. Therefore, the following clauses should hereby be deemed to be incorporated in the description, wherein each clause by itself can stand as a separate example. Although each dependent clause can refer in the clauses to a specific combination with one of the other clauses, the aspect(s) of that dependent clause are not limited to the specific combination. It will be appreciated that other example clauses can also include a combination of the dependent clause aspect(s) with the subject matter of any other dependent clause or independent clause or a combination of any feature with other dependent and independent clauses. The various aspects disclosed herein expressly include these combinations, unless it is explicitly expressed or can be readily inferred that a specific combination is not intended (e.g., contradictory aspects, such as defining an element as both an insulator and a conductor). Furthermore, it is also intended that aspects of a clause can be included in any other independent clause, even if the clause is not directly dependent on the independent clause.

In the detailed description above it can be seen that different features are grouped together in examples. This manner of disclosure should not be understood as an intention that the example clauses have more features than are explicitly mentioned in each clause. Rather, the various aspects of the disclosure may include fewer than all features of an individual example clause disclosed. Therefore, the following clauses should hereby be deemed to be incorporated in the description, wherein each clause by itself can stand as a separate example. Although each dependent clause can refer in the clauses to a specific combination with one of the other clauses, the aspect(s) of that dependent clause are not limited to the specific combination. It will be appreciated that other example clauses can also include a combination of the dependent clause aspect(s) with the subject matter of any other dependent clause or independent clause or a combination of any feature with other dependent and independent clauses. The various aspects disclosed herein expressly include these combinations, unless it is explicitly expressed or can be readily inferred that a specific combination is not intended (e.g., contradictory aspects, such as defining an element as both an insulator and a conductor). Furthermore, it is also intended that aspects of a clause can be included in any other independent clause, even if the clause is not directly dependent on the independent clause. Implementation examples are described in the following numbered clauses:

Clause 1. A method comprising: transmitting, by an initiator, a positioning reference signal; receiving, by the initiator, responder positioning reference signals, sent from individual responders of a plurality of responders; transmitting, by the initiator, a measurement message comprising a first set of measurements that are determined based on the positioning reference signal and the plurality of responder positioning reference signals; receiving, by the initiator, responder measurement messages, sent from the individual responders of the plurality of responders; receiving, by the initiator, updated map information from an anchor; and updating, by the initiator, pre-existing map information that is accessible to the initiator, based on the updated map information.

Clause 2. The method of clause 1, wherein, before transmitting, by the initiator, the positioning reference signal, the method further comprises: transmitting a pre-positioning request to initiate a positioning session; and receiving a plurality of pre-positioning responses, each pre-positioning response of the plurality of pre-positioning responses sent from individual responders of the plurality of responders.

Clause 3. The method of any of clauses 1 to 2, wherein the first set of measurements are determined based on the positioning reference signal and the responder positioning reference signals by: determining a time-of-departure associated with the positioning reference signal; determining an angle-of-departure associated with the positioning reference signal; determining a time-of-arrival associated with individual positioning reference signals of the plurality of responder positioning reference signals; and determining an angle-of-arrival associated with individual positioning reference signals of the responder positioning reference signals.

Clause 4. The method of any of clauses 1 to 3, further comprising determining a second set of measurements based on receiving a plurality of responder measurement messages by: determining a time-of-arrival associated with the positioning reference signal at the individual responders of the plurality of responders; determining an angle-of-arrival associated with the positioning reference signal at the individual responders of the plurality of responders; determining a time-of-departure associated with individual responder positioning reference signals of the plurality of responder positioning reference signals; and determining an angle-of-departure associated with individual responder positioning reference signals of the plurality of responder positioning reference signals.

Clause 5. The method of any of clauses 1 to 4, wherein the measurement message further comprises: the pre-existing map information that is accessible to the initiator.

Clause 6. The method of any of clauses 1 to 5, wherein the updated map information includes at least one object that is classified as being either line of sight or non-line of sight.

Clause 7. The method of any of clauses 1 to 6, wherein the updated map information includes at least one object that is classified as either a dynamic object or a static object.

Clause 8. A method comprising: receiving, by a responder device, an initiator positioning reference signal from an initiator device; receiving, by the responder device, one or more responder positioning reference signals from one or more additional responder devices; transmitting, by the responder device, a positioning reference signal; transmitting, by the responder device, a measurement message comprising a first set of measurements determined based on: the initiator positioning reference signal; the one or more responder positioning reference signals; the transmitted positioning reference signal; or any combination thereof; receiving, by the responder device, an initiator measurement message from the initiator device; and receiving, by the responder device, one or more responder measurement messages from the one or more additional responder devices.

Clause 9. The method of clause 8, further comprising: transmitting a second set of measurements that are determined based on: the initiator measurement message; the one or more responder measurement messages; or any combination thereof.

Clause 10. The method of any of clauses 8 to 9, wherein: the measurement message includes map information.

Clause 11. The method of any of clauses 8 to 10, further comprising: receiving, by the responder device, a pre-positioning request from the initiator device to initiate a positioning session; and transmitting, by the responder device, a pre-positioning response.

Clause 12. The method of any of clauses 8 to 11, wherein the first set of measurements comprise: a time-of-departure; an angle-of-departure; a time-of-arrival; an angle-of-arrival; or any combination thereof.

Clause 14. The method of any of clauses 8 to 12, wherein the initiator device is associated with a vehicle or a pedestrian.

Clause 15. A method comprising: receiving, by an anchor device, a plurality of measurement messages from a plurality of participants in a positioning session, the participants including an initiator device and one or more responder devices, individual measurement messages of the plurality of measurement messages comprising a set of measurements associated with: a positioning reference signal transmitted by the initiator device; and one or more responder positioning reference signals, wherein individual responder positioning reference signals are received from individual responder devices of the one or more responder devices; and transmitting, by the anchor device, anchor map information to each participant of the plurality of participants, wherein the anchor map information comprises one or more objects in the anchor map information that are classified, using a machine learning algorithm of the anchor device, based at least in part on the measurement message received from each participant of the plurality of participants.

Clause 16. The method of clause 15, wherein: at least one measurement message of the plurality of measurement messages includes participant map information associated with a particular participant of the plurality of participants; the anchor map information is updated based at least in part on the participant map information to create updated anchor map information; and transmitting, by the anchor device, the updated anchor map information to each participant of the plurality of participants.

Clause 17. The method of any of clauses 15 to 16, further comprising: classifying, by the anchor device, at least one object of the one or more objects as being either line of sight or non-line of sight.

Clause 18. The method of any of clauses 15 to 17, further comprising: classifying, by the anchor device, at least one object of the one or more objects as either a dynamic object or a static object.

Clause 19. The method of any of clauses 15 to 18, further comprising: determining, by the anchor device, that the initiator device transmitted a pre-positioning request to initiate a positioning session; and transmitting, by the anchor device, a pre-positioning response.

Clause 20. The method of any of clauses 15 to 19, the set of measurements comprising: a time-of-departure; an angle-of-departure; a time-of-arrival; and an angle-of-arrival.

Clause 21. The method of any of clauses 15 to 20, wherein the anchor device is static.

Clause 22. The method of any of clauses 15 to 21, wherein the initiator device is associated with a vehicle or a pedestrian.

In view of the descriptions and explanations above, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Accordingly, it will be appreciated, for example, that an apparatus or any component of an apparatus may be configured to (or made operable to or adapted to) provide functionality as taught herein. This may be achieved, for example: by manufacturing (e.g., fabricating) the apparatus or component so that it will provide the functionality; by programming the apparatus or component so that it will provide the functionality; or through the use of some other suitable implementation technique. As one example, an integrated circuit may be fabricated to provide the requisite functionality. As another example, an integrated circuit may be fabricated to support the requisite functionality and then configured (e.g., via programming) to provide the requisite functionality. As yet another example, a processor circuit may execute code to provide the requisite functionality.

Moreover, the methods, sequences, and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An example storage medium is coupled to the processor such that the processor can read information from, and write information to, the storage medium. In the alternative, the storage medium may be integral to the processor (e.g., cache memory).

While the foregoing disclosure shows various illustrative aspects, it should be noted that various changes and modifications may be made to the illustrated examples without departing from the scope defined by the appended claims. The present disclosure is not intended to be limited to the specifically illustrated examples alone. For example, unless otherwise noted, the functions, steps, and/or actions of the method claims in accordance with the aspects of the disclosure described herein need not be performed in any particular order. Furthermore, although certain aspects may be described or claimed in the singular, the plural is contemplated unless limitation to the singular is explicitly stated.

What is claimed is:

1. A method comprising:
transmitting, by an initiator, a positioning reference signal;
receiving, by the initiator, a plurality of responder positioning reference signals, sent from individual responders of a plurality of responders;
transmitting, by the initiator, a measurement message comprising a first set of measurements that are determined based on the positioning reference signal and the plurality of responder positioning reference signals;

receiving, by the initiator, responder measurement messages, sent from the individual responders of the plurality of responders;

receiving, by the initiator, updated map information from an anchor; and updating, by the initiator, pre-existing map information that is accessible to the initiator, based on the updated map information.

2. The method of claim 1, wherein, before transmitting, by the initiator, the positioning reference signal, the method further comprises:

transmitting a pre-positioning request to initiate a positioning session; and receiving a plurality of pre-positioning responses, each pre-positioning response of the plurality of pre-positioning responses sent from individual responders of the plurality of responders.

3. The method of claim 1, wherein the first set of measurements are determined based on the positioning reference signal and the plurality of responder positioning reference signals by:

determining a time-of-departure associated with the positioning reference signal;

determining an angle-of-departure associated with the positioning reference signal;

determining a time-of-arrival associated with individual positioning reference signals of the plurality of responder positioning reference signals; and determining an angle-of-arrival associated with individual positioning reference signals of the plurality of responder positioning reference signals.

4. The method of claim 1, further comprising determining a second set of measurements based on receiving a plurality of responder measurement messages by:

determining a time-of-arrival associated with the positioning reference signal at the individual responders of the plurality of responders;

determining an angle-of-arrival associated with the positioning reference signal at the individual responders of the plurality of responders;

determining a time-of-departure associated with individual responder positioning reference signals of the plurality of responder positioning reference signals; and determining an angle-of-departure associated with individual responder positioning reference signals of the plurality of responder positioning reference signals.

5. The method of claim 1, wherein the measurement message further comprises:

the pre-existing map information that is accessible to the initiator.

6. The method of claim 1, wherein the updated map information includes at least one object that is classified as being either line of sight or non-line of sight.

7. The method of claim 1, wherein the updated map information includes at least one object that is classified as either a dynamic object or a static object.

8. The method of claim 1, wherein:

the initiator device is included in a vehicle.

9. An initiator device comprising:

a wireless transceiver;

memory; and one or more processors communicatively coupled to the wireless transceiver and to the memory, and configured to:

cause a positioning reference signal to be transmitted;

receive a plurality of responder positioning reference signals, individual responder positioning reference signals of the plurality of responder positioning reference signals sent from individual responders of a plurality of responders;

transmit a measurement message comprising a first set of measurements, the first set of measurements determined based on the positioning reference signal and the plurality of responder positioning reference signals;

receive a plurality of responder measurement messages, individual responder measurement messages of the plurality of responder measurement messages sent from the individual responders of the plurality of responders;

receive updated map information from an anchor; and update pre-existing map information that is accessible to the initiator device, based on the updated map information.

10. The initiator device of claim 9, wherein the one or more processors are further configured to, before transmitting the positioning reference signal:

transmit a pre-positioning request to initiate a positioning session; and receive pre-positioning responses, each pre-positioning response of the pre-positioning responses sent from a responder of the plurality of responders.

11. The initiator device of claim 9, wherein the first set of measurements are determined based on the positioning reference signal and the plurality of responder positioning reference signals comprises the one or more processors configured to:

determine a time-of-departure associated with the positioning reference signal;

determine an angle-of-departure associated with the positioning reference signal;

determine a time-of-arrival associated with individual positioning reference signals of the plurality of responder positioning reference signals; and determine an angle-of-arrival associated with individual positioning reference signals of the plurality of responder positioning reference signals.

12. The initiator device of claim 9, wherein the one or more processors are configured to determine a second set of measurements based on the plurality of responder measurement messages comprises the one or more processors configured to:

determine a time-of-arrival associated with the positioning reference signal at the individual responders of the plurality of responders;

determine an angle-of-arrival associated with the positioning reference signal at the individual responders of the plurality of responders;

determine a time-of-departure associated with individual responder positioning reference signals of the plurality of responder positioning reference signals; and determine an angle-of-departure associated with individual responder positioning reference signals of the plurality of responder positioning reference signals.

13. The initiator device of claim 9, wherein the measurement message further comprises:

the pre-existing map information that is accessible to the initiator device.

14. The initiator device of claim 9, wherein the updated map information includes:

a first object that is classified as being either line of sight or non-line of sight.

15. The initiator device of claim 9, wherein the updated map information includes:
a second object that is classified as either a dynamic object or a static object.

16. The initiator device of claim 9, wherein:
the initiator device is included in a vehicle.

17. A method comprising:
receiving, by a responder device, an initiator positioning reference signal from an initiator device;
receiving, by the responder device, one or more responder positioning reference signals from one or more additional responder devices;
transmitting, by the responder device, a positioning reference signal;
transmitting, by the responder device, a measurement message comprising a first set of measurements determined based on:
the initiator positioning reference signal;
the one or more responder positioning reference signals;
the transmitted positioning reference signal; or
any combination thereof;
receiving, by the responder device, an initiator measurement message from the initiator device; and
receiving, by the responder device, one or more responder measurement messages from the one or more additional responder devices.

18. The method of claim 17, further comprising:
transmitting a second set of measurements that are determined based on:
the initiator measurement message;
the one or more responder measurement messages; or
any combination thereof.

19. The method of claim 17, wherein:
the measurement message includes map information.

20. The method of claim 17, further comprising:
receiving, by the responder device, a pre-positioning request from the initiator device to initiate a positioning session; and
transmitting, by the responder device, a pre-positioning response.

21. The method of claim 17, wherein the first set of measurements comprise:
a time-of-departure;
an angle-of-departure;
a time-of-arrival;
an angle-of-arrival; or
any combination thereof.

22. The method of claim 17, wherein the initiator device is associated with a vehicle or a pedestrian.

23. A method comprising:
receiving, by an anchor device, a plurality of measurement messages from a plurality of participants in a positioning session, the plurality of participants including an initiator device and one or more responder devices, individual measurement messages of the plurality of measurement messages comprising a set of measurements associated with:
a positioning reference signal transmitted by the initiator device; and
one or more responder positioning reference signals, wherein individual responder positioning reference signals are received from individual responder devices of the one or more responder devices; and
transmitting, by the anchor device, anchor map information to each participant of the plurality of participants, wherein the anchor map information comprises one or more objects in the anchor map information that are classified, using a machine learning algorithm of the anchor device, based at least in part on the measurement message received from each participant of the plurality of participants.

24. The method of claim 23, wherein:
at least one measurement message of the plurality of measurement messages includes participant map information associated with a particular participant of the plurality of participants;
the anchor map information is updated based at least in part on the participant map information to create updated anchor map information; and
the method further comprises transmitting, by the anchor device, the updated anchor map information to each participant of the plurality of participants.

25. The method of claim 23, further comprising:
classifying, by the anchor device, at least one object of the one or more objects as being either line of sight or non-line of sight.

26. The method of claim 23, further comprising:
classifying, by the anchor device, at least one object of the one or more objects as either a dynamic object or a static object.

27. The method of claim 23, further comprising:
determining, by the anchor device, that the initiator device transmitted a pre-positioning request to initiate a positioning session; and
transmitting, by the anchor device, a pre-positioning response.

28. The method of claim 23, the set of measurements comprising:
a time-of-departure;
an angle-of-departure;
a time-of-arrival; and
an angle-of-arrival.

29. The method of claim 23, wherein the anchor device is static.

30. The method of claim 23, wherein the initiator device is associated with a vehicle or a pedestrian.

* * * * *